Figure 4:
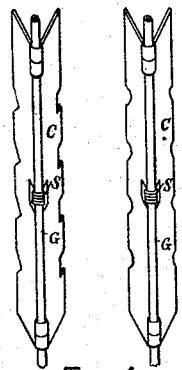

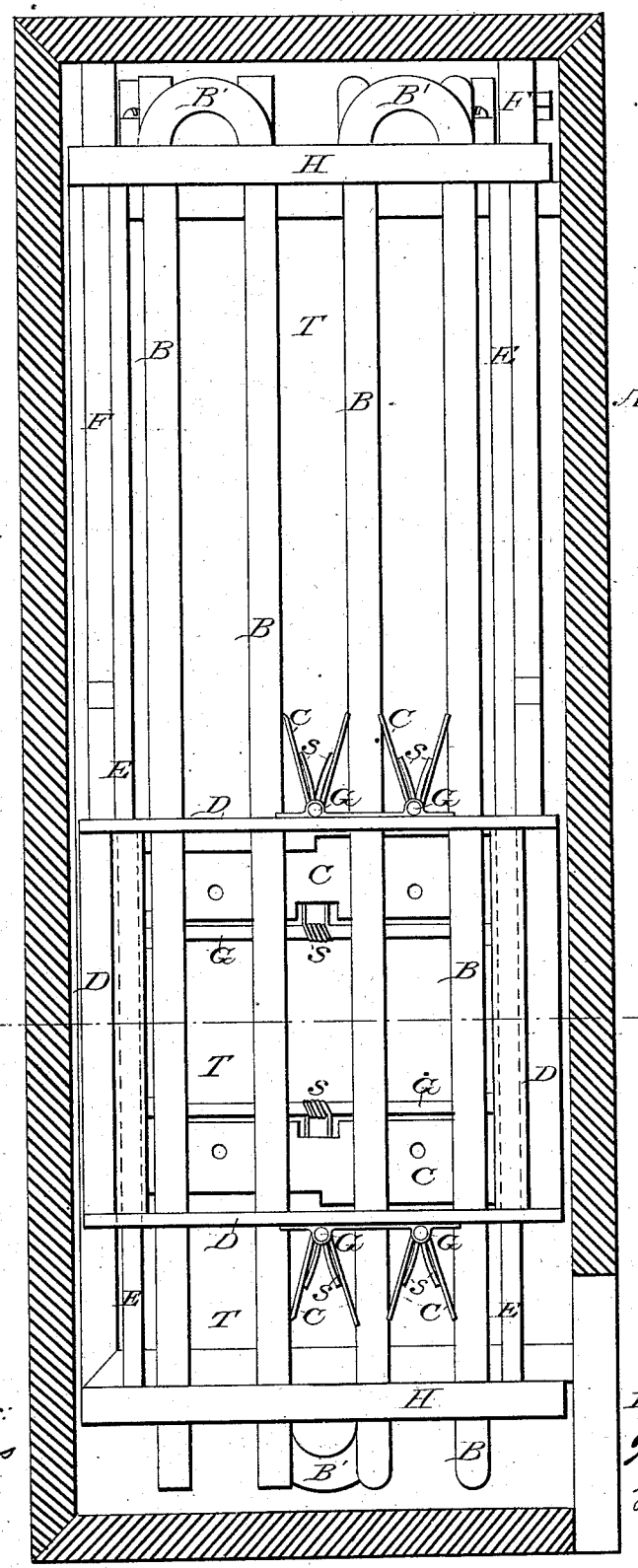

2 Sheets—Sheet 2.

W. P. BIGELOW.
Air Drying and Refrigerating Apparatus.

No. 237,236. Patented Feb. 1, 1881.

Witnesses.
A. H. Spencer
E. C. Perkins

Inventor.
William P. Bigelow.

UNITED STATES PATENT OFFICE.

WILLIAM P. BIGELOW, OF NATICK, MASSACHUSETTS.

AIR DRYING AND REFRIGERATING APPARATUS.

SPECIFICATION forming part of Letters Patent No. 237,236, dated February 1, 1881.

Application filed July 7, 1879.

*To all whom it may concern:*

Be it known that I, WILLIAM P. BIGELOW, of Natick, Massachusetts, have invented certain Improvements in Air Drying and Refrigerating Apparatus; and I do hereby declare that the same are fully described in the following specification and illustrated in the accompanying drawings.

The object of my invention is to provide an efficient air cooling and drying apparatus by the employment of a stand of straight parallel independent pipes, properly joined, through which a refrigerant circulates, and to increase the refrigerating-power of such apparatus by combining therewith a series of reciprocating scrapers or cleaners to prevent the accumulation of ice or frost crystals upon the exterior surfaces of the pipes, and thereby enable such pipes more readily to absorb the latent heat from the surrounding air.

I employ, by preference, for purposes of refrigeration the principle of the expansion of a volatile liquid, like ammonia, on its admission, drop by drop, from a condenser to a system of pipes through which circulates the gas thus formed, whereby an intense degree of cold is produced. I cause currents of air to pass through the chamber containing these pipes, and the moisture in the air coming in contact with them is rapidly condensed and appears on the tubular surface in the form of frost-crystals or ice. A coating of this kind forms a non-conducting sleeve about the tube, and prevents the contact of the air with the tube, thereby interrupting the absorption of heat from the air-current, and by so much impairing the efficiency of the machine.

My invention is in the nature of an improvement upon the apparatus described in Letters Patent No. 192,233, granted June 19, 1877, to Thomas Cook, for improvement in ice and refrigerating machines. Said patent shows and describes the employment of a stationary coil of pipes through which a refrigerant circulates with a rotary brushing or scraping apparatus, or, instead thereof, a rotary coil with stationary brushes for freeing the surfaces of the coiled tubes from frost and snow. I disclaim all such apparatus characterized by rotating brushes or scrapers, or by a rotary refrigerating-wheel, or by any circular, cylindrical, or spiral coil or convolution of pipes.

A serious objection to the coiled arrangement of tubes is the expense attending their construction and repairs and the practical necessity of employing round tubes only and brushes as cleaners therefor, because square pipes cannot be readily coiled, and scrapers will each act on but a single line of the round tubes shown, whose distance from the axis is variable. Continuous rotary motion of the brushes or the pipes is also less likely to clear the surfaces than is the reciprocating movement in my apparatus with spring-pressed scrapers fitting around the tubes. Furthermore, the circular arrangement or coiling of the tubes demands an amount of space greatly in excess of the requirements of my plan, practically prohibiting its introduction on shipboard.

The devices and combinations of devices which form the subject of my various improvements are specifically set forth in the appended claims.

Figure 3:
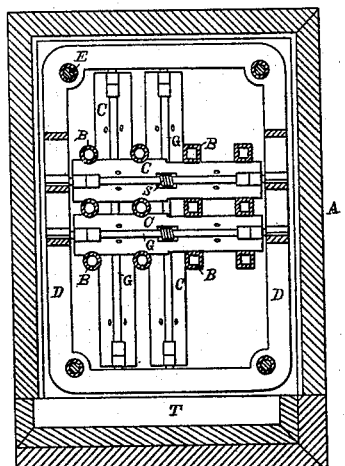
Figure 2:
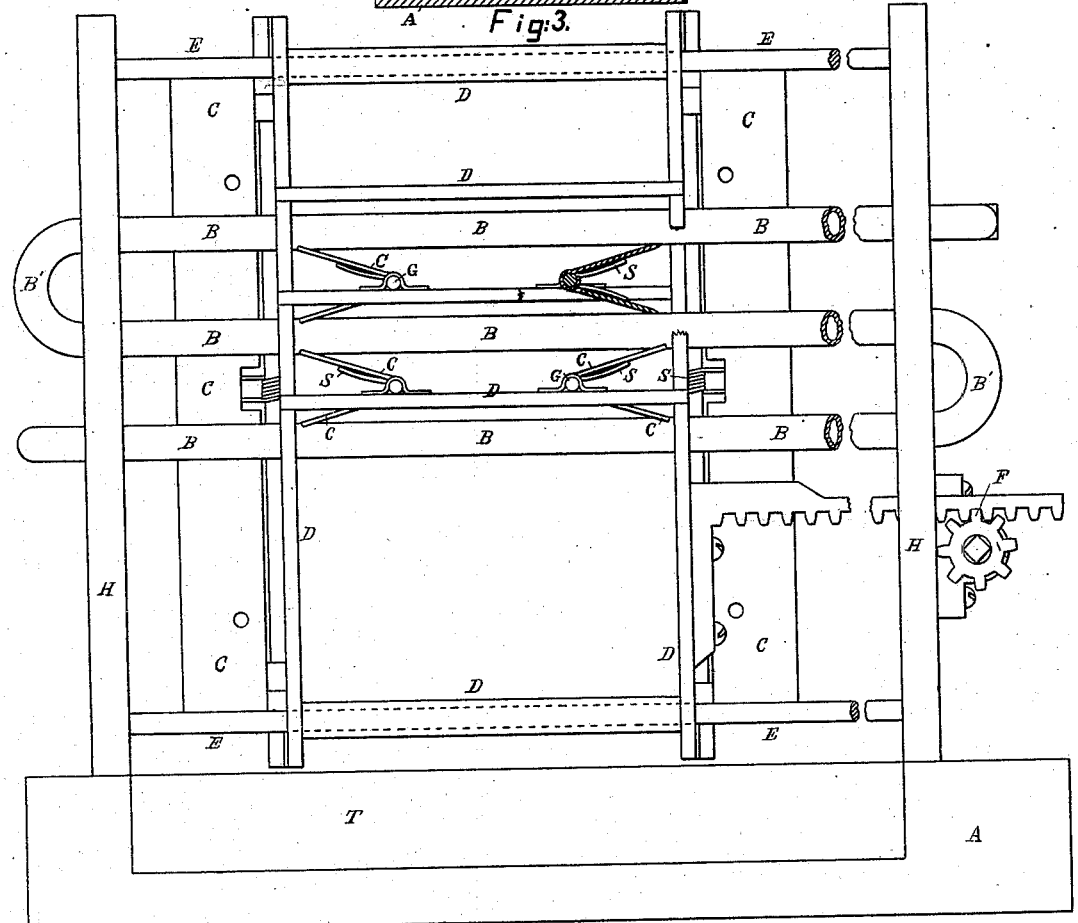

In the drawings, Figure 1 is a plan of a machine embodying my improvements; Fig. 2, a side view of the same, part being broken away, with one form of operative mechanism indicated; Fig. 3, a transverse section taken at *x x*, Fig. 1; and Figs. 4 and 5, various forms of scrapers.

A is a refrigerating-chamber, in which is located the apparatus for cooling and drying the air admitted through an upper opening and passing out at one lower down at the opposite side or end of the chamber.

B B B represent straight parallel tubes, of iron or other good conductor of heat, supported in suitable uprights or frame-work, H, and connected at their ends by return-bends B' or other couplings, so as to form a continuous tube of any desired length—say three hundred feet. The air circulates freely between the several parallel sections of said tube, coming into actual contact with all sides of each section, and thus these independent tubes act most efficiently to cool the air-current. These tubes may be round, square, or of other proper form, preferably inch or inch and a quarter diameter, and as straight as possible. There may be several ranges of these tubes, and each range should connect at one end with the source of supply of the liquid to be vaporized and at the other with a force-pump which draws off the spent gas. Twelve hundred feet of such tubing so connected and used with my improvements will suffice to thoroughly refrigerate a storage-chamber of one hundred thousand cubic feet capacity, to and from which the air is caused to flow through suitable conduits arranged to promote its circulation, which is maintained by a blower or fan in the ordinary way. I arrange the tubes B in tiers or series, horizontally or vertically, side by side and parallel, to facilitate cleaning their surfaces, for which purpose the cleaners reciprocate between the tubes of one series and those of the adjacent series, as well as between the several parallel sections of each tube, so that the entire surface of each tube may be effectually cleaned.

Figure 5:
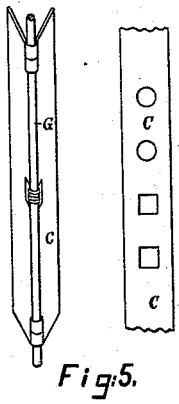

C C are the cleaners, formed of sheet metal, placed each side of or above and below each series of tubes, standing preferably at an acute angle thereto, and spring-pressed thereon in order to cut the ice more thoroughly. When the tubes are square and placed one above another with their sides horizontal and vertical, a straight-edged scraper will bear upon one side of each tube in a series; or the edges of the scrapers may be notched to fit two or more sides. With round tubes, which will ordinarily be used for cheapness, the edges of the scrapers will be recessed in proper curves so as to embrace one-fourth or one-half of each tube of a range or series; or, if preferred, the cleaners may stand transversely to the tubes and be perforated with apertures of a size and shape to receive a tube, so as to clean its periphery entirely. These various forms are illustrated in Figs. 4 and 5.

I am aware that reciprocating cleaners have been devised for use on plane surfaces, between which tortuous passages for the refrigerant are formed by interposed partitions. I make no claim to any such apparatus exposing two sides only of such tortuous conduit.

S S are springs, which serve to press the edges of the scrapers firmly upon the tubes B; but the cleaners may be themselves elastic, and so dispense with independent springs.

D D is a carriage or frame supporting the scrapers C, which are mounted upon it in any suitable manner, so as to be reciprocated on bars E E or other proper supports, or moved back and forth on wheels or rollers by any suitable mechanism. In the drawings, Fig. 2, a rack and pinion, F, are shown; but it is obvious that any equivalent device may be employed which will effect the reciprocation.

I find it most convenient to arrange the scrapers in pairs, and to connect them together and to the carriage D by a rod, G, which serves as a hinge and holds the spring in position.

It is desirable to secure the withdrawal of the snow or frost-crystals from the chamber A without admitting a quantity of warm air during the operation. I therefore provide a removable tray, T, running on trucks or any proper bearings in the bottom of the chamber. As the snow accumulates quite rapidly, I slide out the tray from time to time and remove the accumulation in any convenient manner, while the rear edge of the tray closes the opening, or it may be closed by an independent strip.

I disclaim in this application all apparatus designed to promote the formation of ice over stationary or movable pipes through which a refrigerant circulates, my object being the reverse of this—viz., to keep the outer surfaces of the straight tubes free from ice or frost, that the tubes may more readily absorb the latent caloric from the atmosphere exposed to such surfaces.

I claim as of my invention—

1. The combination of a stand of straight pipes or tubes through which a refrigerant circulates with a series of reciprocating cleaners having notched edges, whereby they may clean from the periphery of the tubes ice or frost-crystals formed thereon, substantially as set forth.

2. Two or more ranges or series of straight independent pipes, exposed on all sides to the air, and suitably connected at their ends into one or more continuous tubes, through which a refrigerant circulates, in combination with a series of cleaners adapted to reciprocate upon and between the several pipes of each range, substantially as set forth.

3. The independent parallel tubes B B, arranged in vertical and horizontal planes, and having an air-space between the adjacent sections of each tube, in combination with cleaners made to reciprocate upon and between the several tube-sections so as to act on all sides of each section, substantially as and for the purposes set forth.

4. The combination, with a stand of pipes through which a refrigerant circulates, of a scraping or cleaning apparatus and a removable tray for withdrawing the snow or ice detached from the surfaces of the conduit, substantially as set forth.

WILLIAM P. BIGELOW.

Witnesses:
A. H. SPENCER,
L. UNDERWOOD.